US006929248B1

(12) United States Patent
Matney, Jr. et al.

(10) Patent No.: US 6,929,248 B1
(45) Date of Patent: Aug. 16, 2005

(54) MECHANICAL JACK

(76) Inventors: Joseph B. Matney, Jr., 6550 Auburn St., Detroit, MI (US) 48228; Barbara Ann Matney, 6550 Auburn, Detroit, MI (US) 48228

( * ) Notice: Subject to any disclaimer, the term of this patent is extended or adjusted under 35 U.S.C. 154(b) by 95 days.

(21) Appl. No.: 10/641,836

(22) Filed: Aug. 15, 2003

(51) Int. Cl.[7] .................................................. B60P 1/48
(52) U.S. Cl. .................. 254/8 B; 254/124; 254/DIG. 3
(58) Field of Search ............................ 254/1, 8 B, 8 R, 254/2 B, 2 R, 124, DIG. 3

(56) References Cited

U.S. PATENT DOCUMENTS

| | | | | |
|---|---|---|---|---|
| D109,499 | S | 5/1938 | Pfauser | |
| 4,018,421 | A | 4/1977 | Tallman | |
| D272,670 | S | 2/1984 | Tsujimura | |
| 4,564,172 | A * | 1/1986 | Arzouman | 254/1 |
| 5,201,494 | A | 4/1993 | Lundman | |
| D423,750 | S | 4/2000 | Hung | |
| D442,345 | S | 5/2001 | Lee et al. | |
| 6,601,827 | B1 * | 8/2003 | Arzouman | 254/126 |
| 6,691,983 | B2 * | 2/2004 | Arzouman | 254/1 |

* cited by examiner

*Primary Examiner*—Jacob K. Ackun, Jr.

(57) ABSTRACT

A mechanical jack comprising a ratcheting gear track connected to a frame. A bell crank arm is pivotally connected to the frame. An elongate handle is rotatably connected to the bell crank arm. A gear pin is connected to the elongate handle. The gear pin is for engaging the ratcheting gear track. An elevator arm is pivotally connected to the frame. The elevator arm is slidably connected to the bell crank arm, and a lift pad is connected to the elevator arm.

19 Claims, 4 Drawing Sheets

MECHANICAL JACK

BACKGROUND OF THE INVENTION

1. Field of the Invention

The present invention relates to a mechanical jack for use in connection with lifting jacks. The mechanical jack has particular utility in connection with mechanical model jacks actuatable by a twistable handle.

2. Description of the Prior Art

Mechanical jacks are desirable for raising and lowering objects such as cars. A need was felt for a mechanical jack that could be shown with model cars such that the jack could be actuated by the twisting of the handle.

The use of lifting jacks is known in the prior art. For example, U.S. Pat. No. 5,201,494 to Lundman discloses a hydraulic jack and pump usable therewith that includes a linkage movable from a first position to a second position for engaging and elevating a load. A hydraulic ram coupled to the linkage for moving the same toward its second position upon the application of fluid pressure, and a pump coupled to the hydraulic ram for applying fluid pressure thereto. The pump includes a piston operable for delivering a first quantity of hydraulic fluid to the ram through a first path at a first pressure. The pump delivers a second quantity of hydraulic fluid to the ram through a second path at a second pressure. The first quantity of hydraulic fluid being substantially larger than the second quantity and the first pressure being substantially lower than the second pressure. A pressure relief valve is coupled to the first path for venting when the back-pressure from the hydraulic ram exceeds a predetermined value. The linkage is advanced at a first higher speed from its first position to engagement with the load and a second lower speed with increased force after the load has been engaged and elevated for elevating by the same. However, the Lundman '494 patent does not have a twisting handle that actuates a jack by engaging ratcheting teeth.

Similarly, U.S. Pat. No. 4,018,421 to Tallman discloses a portable lifting jack that has a base supported on wheels, and elevating linkage, a hydraulic ram operating with the linkage and a handle for pressurizing and releasing the hydraulic ram. An integral block of rectangular configuration serves a multiple purpose of providing a reservoir for hydraulic fluid, mounting the ram, mounting the pump, and providing exteriorly drilled bores for all the hydraulic acitivity. However, the Tallman '421 patent does not have a twisting handle that actuates a jack by engaging ratcheting teeth.

Lastly, U.S. Pat. No. Des 442,345 to Lee et al discloses a trolley jack that has a curved body for not scratching items to be lifted. However, the Lee et al '345 patent does not have a twisting handle that actuates a jack by engaging ratcheting teeth.

While the above-described devices fulfill their respective, particular objectives and requirements, the aforementioned patents do not describe a mechanical jack that allows mechanical model jacks that can be actuated by a twisting handle. The Lundman '494, Tallman '421 and Lee et al '345 patents make no provision for have a twisting handle that actuates a jack by engaging ratcheting teeth.

Therefore, a need exists for a new and improved mechanical jack that can be used for mechanical model jacks that can be actuated by a twisting handle. In this regard, the present invention substantially fulfills this need. In this respect, the mechanical jack according to the present invention substantially departs from the conventional concepts and designs of the prior art, and in doing so provides an apparatus primarily developed for the purpose of mechanical model jacks that can be actuated by a twisting handle.

SUMMARY OF THE INVENTION

In view of the foregoing disadvantages inherent in the known types of lifting jacks now present in the prior art, the present invention provides an improved mechanical jack, and overcomes the above-mentioned disadvantages and drawbacks of the prior art. As such, the general purpose of the present invention, which will be described subsequently in greater detail, is to provide a new and improved mechanical jack and method which has all the advantages of the prior art mentioned heretofore and many novel features that result in a mechanical jack which is not anticipated, rendered obvious, suggested, or even implied by the prior art, either alone or in any combination thereof.

To attain this, the present invention essentially comprises a ratcheting gear track connected to a frame. A bell crank arm is pivotally connected to the frame. An elongate handle is rotatably connected to the bell crank arm. A gear pin is connected to the elongate handle. The gear pin is for engaging the ratcheting gear track. An elevator arm is pivotally connected to the frame. The elevator arm is slidably connected to the bell crank arm, and a lift pad is connected to the elevator arm.

There has thus been outlined, rather broadly, the more important features of the invention in order that the detailed description thereof that follows may be better understood and in order that the present contribution to the art may be better appreciated.

The invention may also include a retaining ring, a ring track, a direction pin, a swivel caster, a roller, a control arm and a transport handle. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mechanical jack that has all of the advantages of the prior art lifting jacks and none of the disadvantages.

It is another object of the present invention to provide a new and improved mechanical jack that may be easily and efficiently manufactured and marketed.

An even further object of the present invention is to provide a new and improved mechanical jack that has a low cost of manufacture with regard to both materials and labor, and which accordingly is then susceptible of low prices of sale to the consuming public, thereby making such mechanical jack economically available to the buying public.

Still another object of the present invention is to provide a new mechanical jack that provides in the apparatuses and methods of the prior art some of the advantages thereof, while simultaneously overcoming some of the disadvantages normally associated therewith.

Even still another object of the present invention is to provide a mechanical jack for mechanical model jacks that can be actuated by a twisting handle.

Lastly, it is an object of the present invention is to provide a mechanical jack that has ratcheting teeth.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
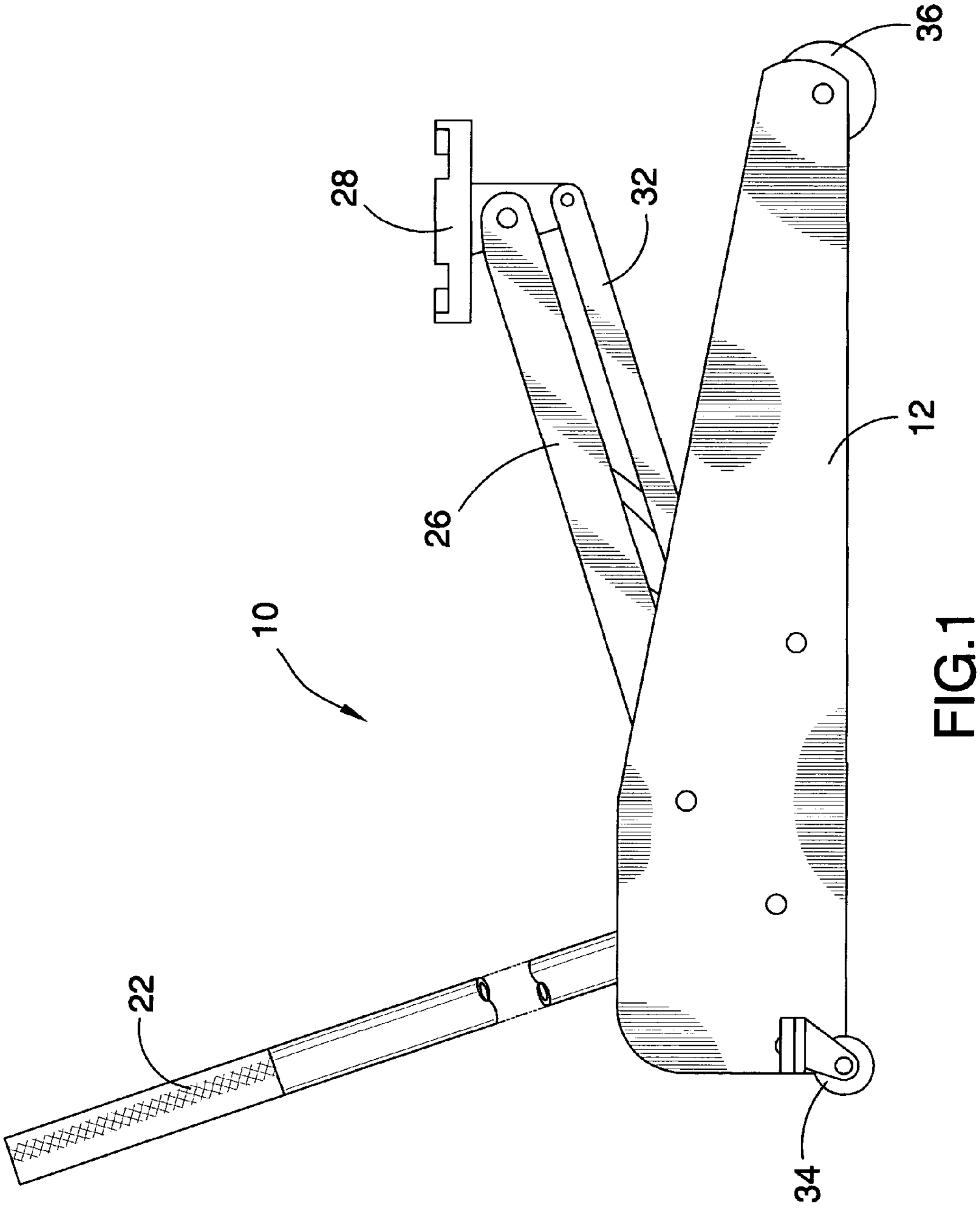
FIG. 1 is a right side view of the preferred embodiment of the mechanical jack constructed in accordance with the principles of the present invention.

Referring now to the drawings, and particularly to FIGS. 1–4, a preferred embodiment of the mechanical jack of the present invention is shown and generally designated by the reference numeral 10.

In FIG. 1, a new and improved mechanical jack 10 of the present invention for mechanical model jacks that can be actuated by a twisting handle is illustrated and will be described. A bell crank arm 20 is pivotally connected to a frame 12. An elongate handle 22 is rotatably connected to the bell crank arm 20. An elevator arm 26 is pivotally connected to the frame 12. The elevator arm 26 is slidably connected to the bell crank arm 20. A lift pad 28 is connected to the elevator arm 26. A control arm 32 is pivotally connected to the frame 12. The control arm 32 is pivotally connected to the lift pad 28. At least one swivel caster 34 is connected to the frame 12. At least one roller 36 is connected to the frame 12.

Figure 2:
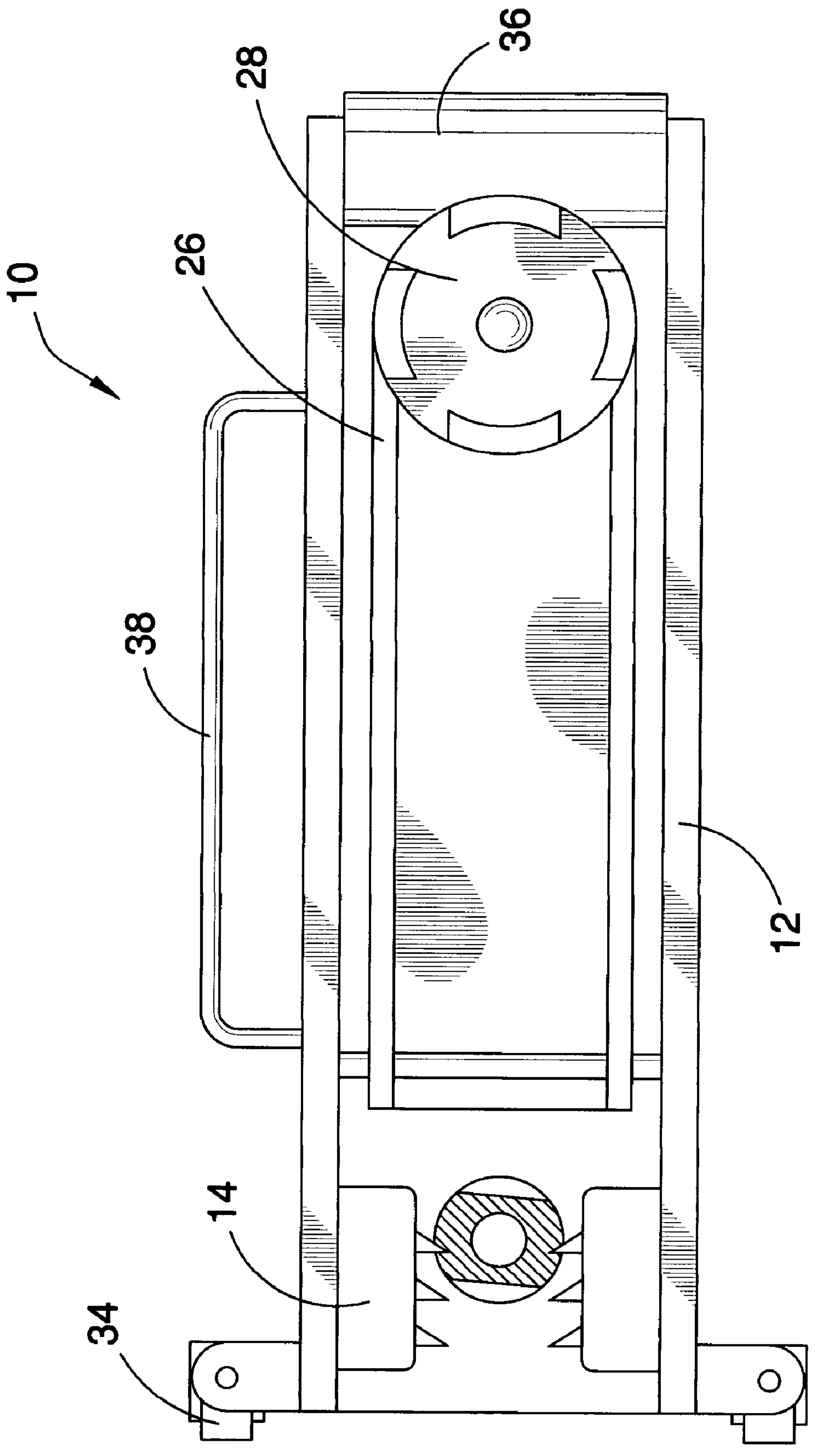
FIG. 2 is a plan view of the mechanical jack of the present invention.

In FIG. 2, the mechanical jack 10 is illustrated and will be described. The mechanical jack 10 has a ratcheting gear track 14 connected to the frame 12. The bell crank arm 20 is pivotally connected to the frame 12. The elevator arm 26 is pivotally connected to the frame 12. The elevator arm 26 is slidably connected to the bell crank arm 20. The lift pad 28 is connected to the elevator arm 26. The swivel caster 34 is connected to the frame 12. The roller 36 is connected to the frame 12. The transport handle 38 is connected to the frame 12.

Figure 3:
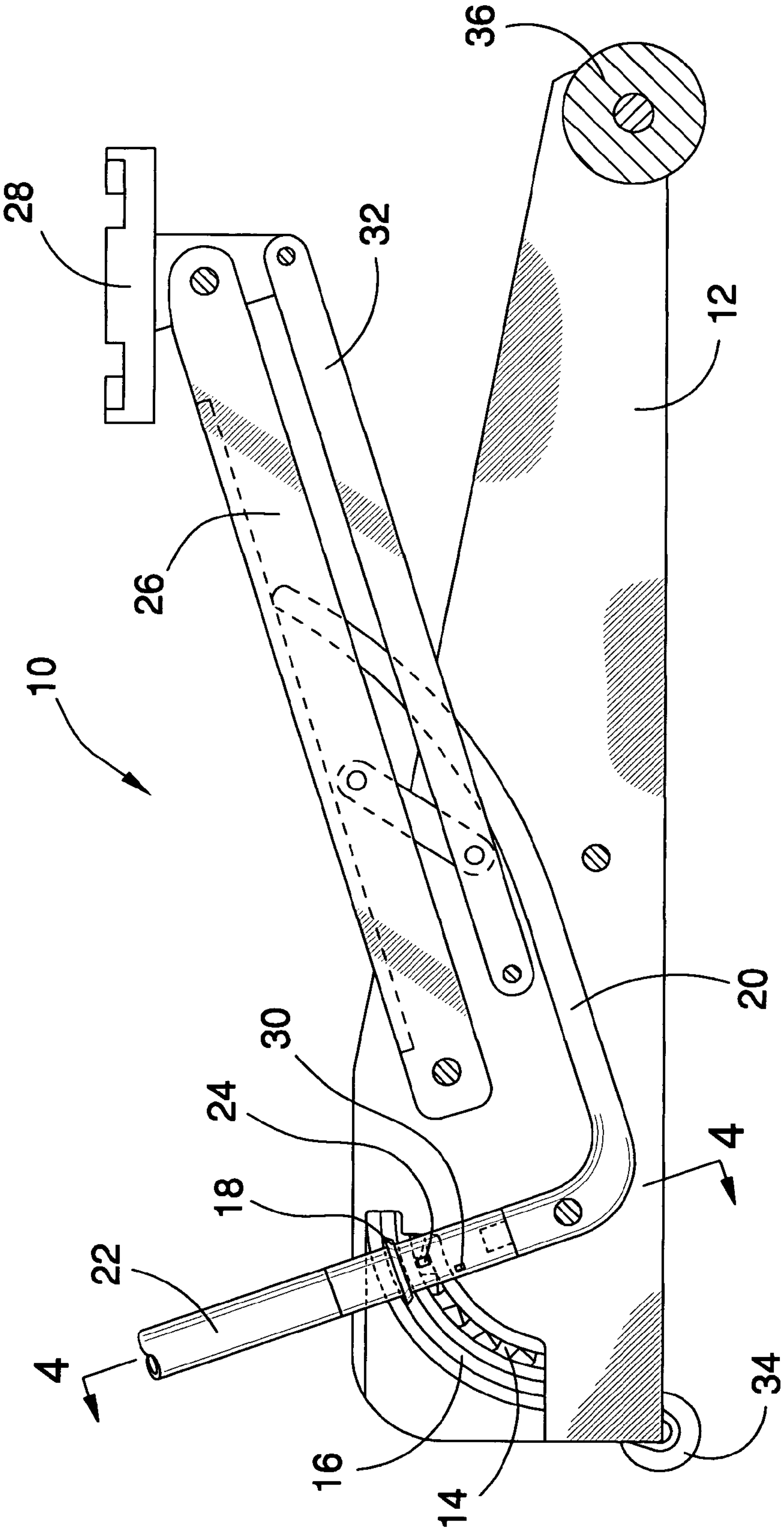
FIG. 3 is a section view of the mechanical jack of the present invention.

In FIG. 3, the mechanical jack 10 is illustrated and will be described. The mechanical jack 10 has the ratcheting gear track 14 connected to the frame 12. The ratcheting gear track 14 has a ring track groove 16 therein. The bell crank arm 20 is pivotally connected to the frame 12. The handle 22 is rotatably connected to the bell crank arm 20. A gear pin 24 is connected to the handle 22. The gear pin 24 is for engaging the ratcheting gear track 14. The elevator arm 26 is pivotally connected to the frame 12. The elevator arm 26 is slidably connected to the bell crank arm 20. The lift pad 28 is connected to the elevator arm 26. A direction pin 30 is connected to the handle 22. The direction pin 30 is capable of engaging the ratcheting gear track 14 to lower the bell crank arm 20. A retaining ring 18 is connected to the handle 22. The retaining ring 18 is complementary to the ring track groove 16. The control arm 32 is pivotally connected to the frame 12. The control arm 32 is pivotally connected to the lift pad 28. The swivel caster 34 is connected to the frame 12. The roller 36 is connected to the frame 12.

Figure 4:
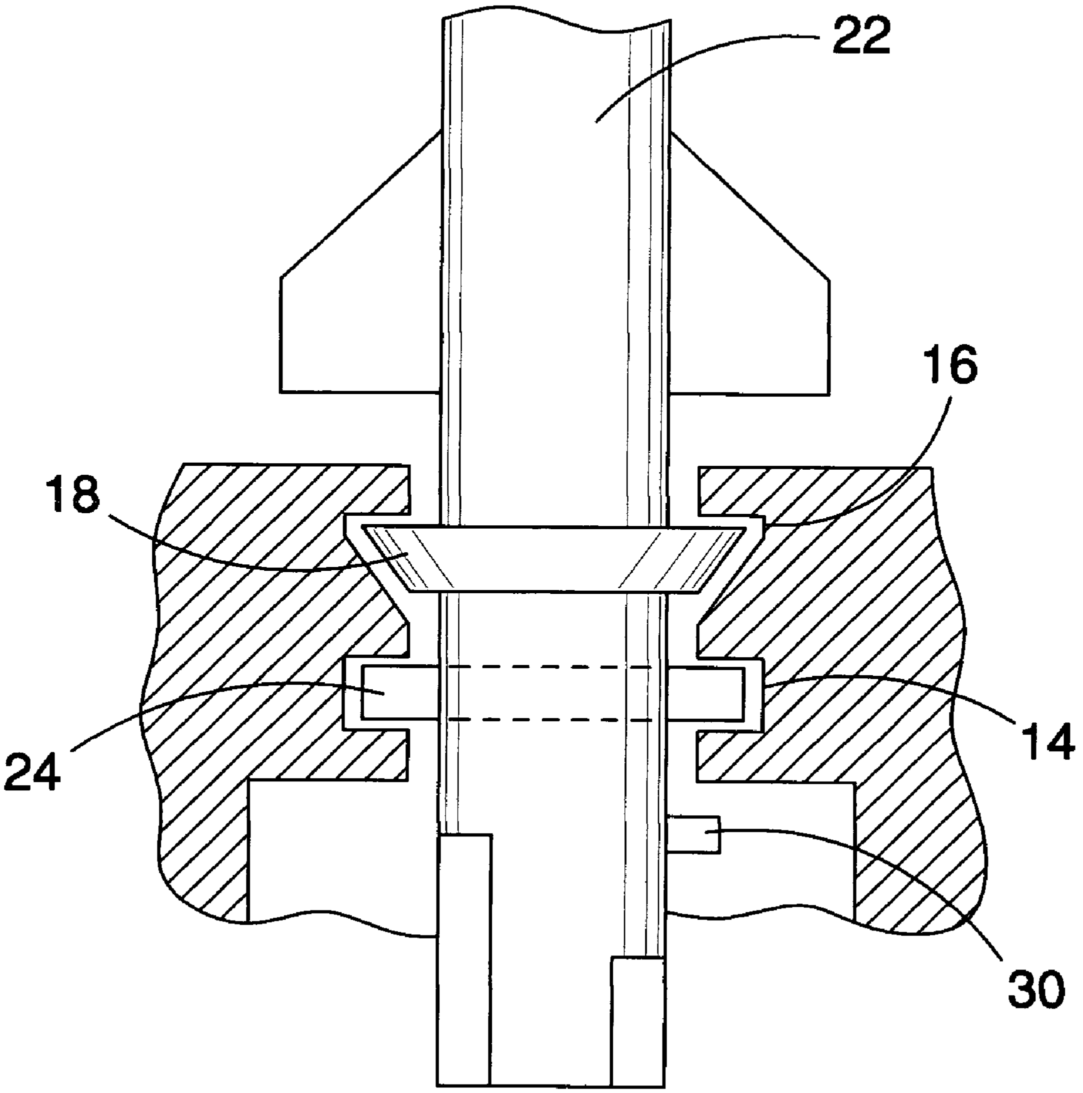
FIG. 4 is a section 4—4 view of FIG. 3 of the mechanical jack of the present invention.

In FIG. 4, the mechanical jack 10 is illustrated and will be described. The ratcheting gear track 14 has the ring track groove 16 therein. The gear pin 24 is connected to the handle 22. The gear pin 24 is for engaging the ratcheting gear track 14. The direction pin 30 is connected to the handle 22. The direction pin 30 is capable of engaging the ratcheting gear track 14 to lower the bell crank arm 20. The retaining ring 18 is connected to the handle 22. The retaining ring 18 is complementary to the ring track groove 16.

In use, it can now be understood that to lift the lift pad 28 the handle 22 is rotated. To lower the lift pad 28 the handle 22 is rotated in the opposite direction one quarter turn and the lift pad 28 lowers.

While a preferred embodiment of the mechanical jack has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material plastic or composite may be used instead of the cast metal described. And although mechanical model jacks that can be actuated by a twisting handle have been described, it should be appreciated that the mechanical jack herein described is also suitable for lifting a weight with a quick release.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A mechanical jack comprising:
a frame;
a ratcheting gear track connected to said frame;
a bell crank arm pivotally connected to said frame;
an elongate handle rotatably connected to said bell crank arm; and
a gear pin connected to said elongate handle, said gear pin for engaging said ratcheting gear track.

2. The mechanical jack of claim 1 further comprising:
an elevator arm pivotally connected to said frame, said elevator arm in slidably connected to said bell crank arm.

3. The mechanical jack of claim 2 further comprising:
a lift pad connected to said elevator arm.

4. The mechanical jack of claim 3 further comprising:
a control arm pivotally connected to said frame, said control arm pivotally connected to said lift pad.

5. The mechanical jack of claim 1 further comprising:
a direction pin connected to said handle, said direction pin capable of engaging said ratcheting gear track to lower said bell crank arm.

6. The mechanical jack of claim 1 further comprising:
a retaining ring connected to said handle.

7. The mechanical jack of claim 6 wherein:
said ratcheting gear track having a ring track groove therein, said ring track groove complementary to said retaining ring.

8. The mechanical jack of claim 1 further comprising:
at least one swivel caster connected to said frame.

9. The mechanical jack of claim 1 further comprising:
at least one roller connected to said frame.

10. The mechanical jack of claim 1 further comprising:
a transport handle connected to said frame.

11. A mechanical jack comprising:
a frame;
a ratcheting gear track connected to said frame;
a bell crank arm pivotally connected to said frame;
an elongate handle rotatably connected to said bell crank arm;
a gear pin connected to said elongate handle, said gear pin for engaging said ratcheting gear track;
an elevator arm pivotally connected to said frame, said elevator arm in slidably connected to said bell crank arm; and
a lift pad connected to said elevator arm.

12. The mechanical jack of claim 11 further comprising:
a direction pin connected to said handle, said direction pin capable of engaging said ratcheting gear track to lower said bell crank arm.

13. The mechanical jack of claim 12 further comprising:
a retaining ring connected to said handle.

14. The mechanical jack of claim 13 wherein:
said ratcheting gear track having a ring track groove therein, said ring track groove complementary to said retaining ring.

15. The mechanical jack of claim 14 further comprising:
a control arm pivotally connected to said frame, said control arm pivotally connected to said lift pad.

16. The mechanical jack of claim 15 further comprising:
at least one swivel caster connected to said frame.

17. The mechanical jack of claim 16 further comprising:
at least one roller connected to said frame.

18. The mechanical jack of claim 17 further comprising:
a transport handle connected to said frame.

19. A mechanical jack comprising:
a frame;
a ratcheting gear track connected to said frame, said ratcheting gear track having a ring track groove therein;
a bell crank arm pivotally connected to said frame;
an elongate handle rotatably connected to said bell crank arm;
a gear pin connected to said elongate handle, said gear pin for engaging said ratcheting gear track;
an elevator arm pivotally connected to said frame, said elevator arm slidably connected to said bell crank arm;
a lift pad connected to said elevator arm;
a direction pin connected to said handle, said direction pin capable of engaging said ratcheting gear track to lower said bell crank arm;
a retaining ring connected to said handle, said retaining ring complementary to said ring track groove;
a control arm pivotally connected to said frame, said control arm pivotally connected to said lift pad;
at least one swivel caster connected to said frame;
at least one roller connected to said frame; and
a transport handle connected to said frame.

* * * * *